(12) United States Patent
Weiss et al.

(10) Patent No.: US 7,652,847 B2
(45) Date of Patent: Jan. 26, 2010

(54) MINIMIZED SKEW ANGLE SLIDER

(75) Inventors: Joel R. Weiss, Fremont, CA (US); Kaizhong Gao, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 673 days.

(21) Appl. No.: 10/734,377

(22) Filed: Dec. 12, 2003

(65) Prior Publication Data

US 2005/0128642 A1 Jun. 16, 2005

(51) Int. Cl.
*G11B 17/32* (2006.01)

(52) U.S. Cl. .................................................. 360/236.3

(58) Field of Classification Search .............. 360/236.1, 360/236.2, 236.3, 235.8, 236.8
See application file for complete search history.

(56) References Cited

U.S. PATENT DOCUMENTS

| | | | | |
|---|---|---|---|---|
| 4,630,158 A * | 12/1986 | Spash | ...................... | 360/245 |
| 5,138,507 A | 8/1992 | Zarouri et al. | ............ | 360/245.3 |
| 5,617,274 A * | 4/1997 | Ruiz | ....................... | 360/245.5 |
| 5,711,063 A * | 1/1998 | Budde et al. | ............. | 29/603.06 |
| 5,847,902 A * | 12/1998 | Clifford et al. | ........... | 360/245.6 |
| 5,856,896 A * | 1/1999 | Berg et al. | ............... | 360/245.3 |
| 5,877,920 A | 3/1999 | Resh | ....................... | 360/245.7 |
| 5,896,246 A * | 4/1999 | Budde et al. | ............. | 360/244.4 |
| 5,898,541 A * | 4/1999 | Boutaghou et al. | ....... | 360/294.4 |
| 5,956,209 A * | 9/1999 | Shum | ...................... | 360/244.3 |
| 6,021,024 A | 2/2000 | Akiyama et al. | ......... | 360/236.8 |
| 6,125,015 A * | 9/2000 | Carlson et al. | ........... | 360/245.9 |
| 6,130,808 A | 10/2000 | Yotsuya | .................... | 360/235.4 |
| 6,166,890 A | 12/2000 | Stefansky et al. | ......... | 360/294.4 |
| 6,181,522 B1 * | 1/2001 | Carlson | .................... | 360/245.1 |
| 6,212,032 B1 | 4/2001 | Park et al. | ................ | 360/234.7 |
| 6,243,350 B1 * | 6/2001 | Knight et al. | ............... | 369/126 |
| 6,249,404 B1 * | 6/2001 | Doundakov et al. | ...... | 360/245.4 |
| 6,288,875 B1 * | 9/2001 | Budde | ...................... | 360/245.3 |
| 6,304,420 B1 | 10/2001 | Murphy et al. | ........... | 360/245.7 |
| 6,344,948 B1 | 2/2002 | Tang et al. | ............... | 360/234.6 |
| 6,378,195 B1 | 4/2002 | Carlson | .................... | 29/603.03 |
| 6,407,888 B1 | 6/2002 | Crane | ....................... | 360/244.5 |
| 6,417,996 B1 * | 7/2002 | Budde | ...................... | 360/245.7 |
| 6,445,545 B1 | 9/2002 | Guo et al. | ................. | 360/245.1 |
| 6,449,221 B1 * | 9/2002 | Knight et al. | ............. | 369/13.35 |
| 6,473,384 B1 * | 10/2002 | Oumi et al. | ............ | 369/112.01 |
| 6,480,459 B2 * | 11/2002 | Budde | ......................... | 720/682 |
| 6,535,355 B2 | 3/2003 | Boutaghou et al. | ........ | 360/245.7 |
| 6,580,572 B1 * | 6/2003 | Yao et al. | ........................ | 360/25 |
| 6,597,530 B2 | 7/2003 | Asano et al. | ............. | 360/77.04 |
| 6,608,735 B1 | 8/2003 | Serpe et al. | ............... | 360/235.6 |
| 6,628,480 B2 * | 9/2003 | Kohira et al. | ............. | 360/235.7 |
| 6,680,821 B2 * | 1/2004 | Kang | ....................... | 360/235.7 |
| 6,724,694 B2 * | 4/2004 | Knight et al. | ............. | 369/13.55 |
| 6,801,400 B2 * | 10/2004 | Fu et al. | .................... | 360/245.7 |
| 2002/0110026 A1 * | 8/2002 | Rafaelof | ..................... | 365/200 |
| 2004/0202055 A1 * | 10/2004 | Knight et al. | ............. | 369/13.33 |
| 2008/0084638 A1 * | 4/2008 | Bonin | ..................... | 360/244.8 |
| 2008/0297948 A1 * | 12/2008 | Yao | .......................... | 360/294.4 |

* cited by examiner

*Primary Examiner*—Allen T Cao
(74) *Attorney, Agent, or Firm*—Westman, Champlin & Kelly, P.A.

(57) ABSTRACT

One embodiment of the present invention pertains to a suspension assembly comprising a suspension, a slider, and a suspension interface by which the slider is rotatably connected about a yaw axis to the suspension.

38 Claims, 11 Drawing Sheets

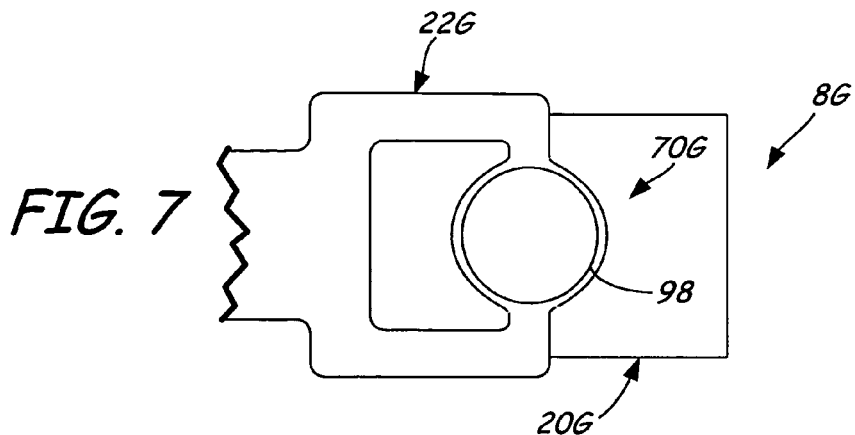
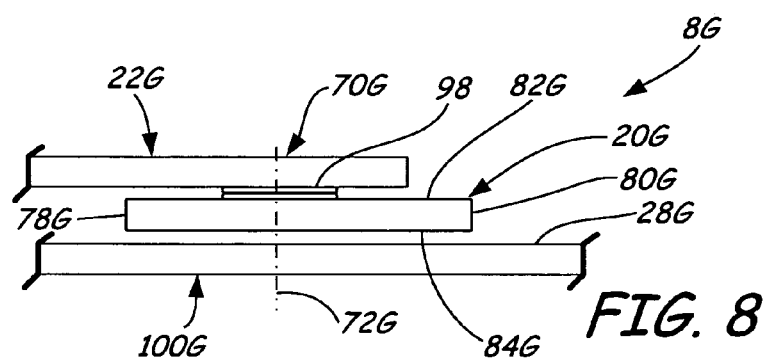
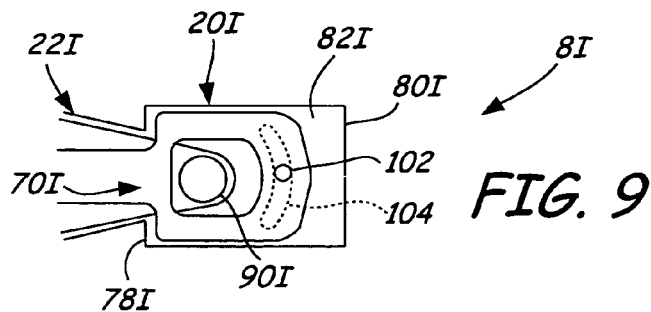
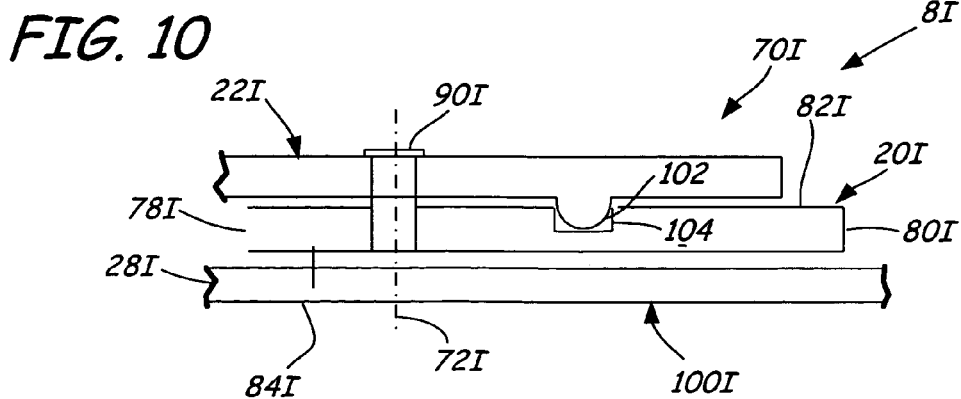

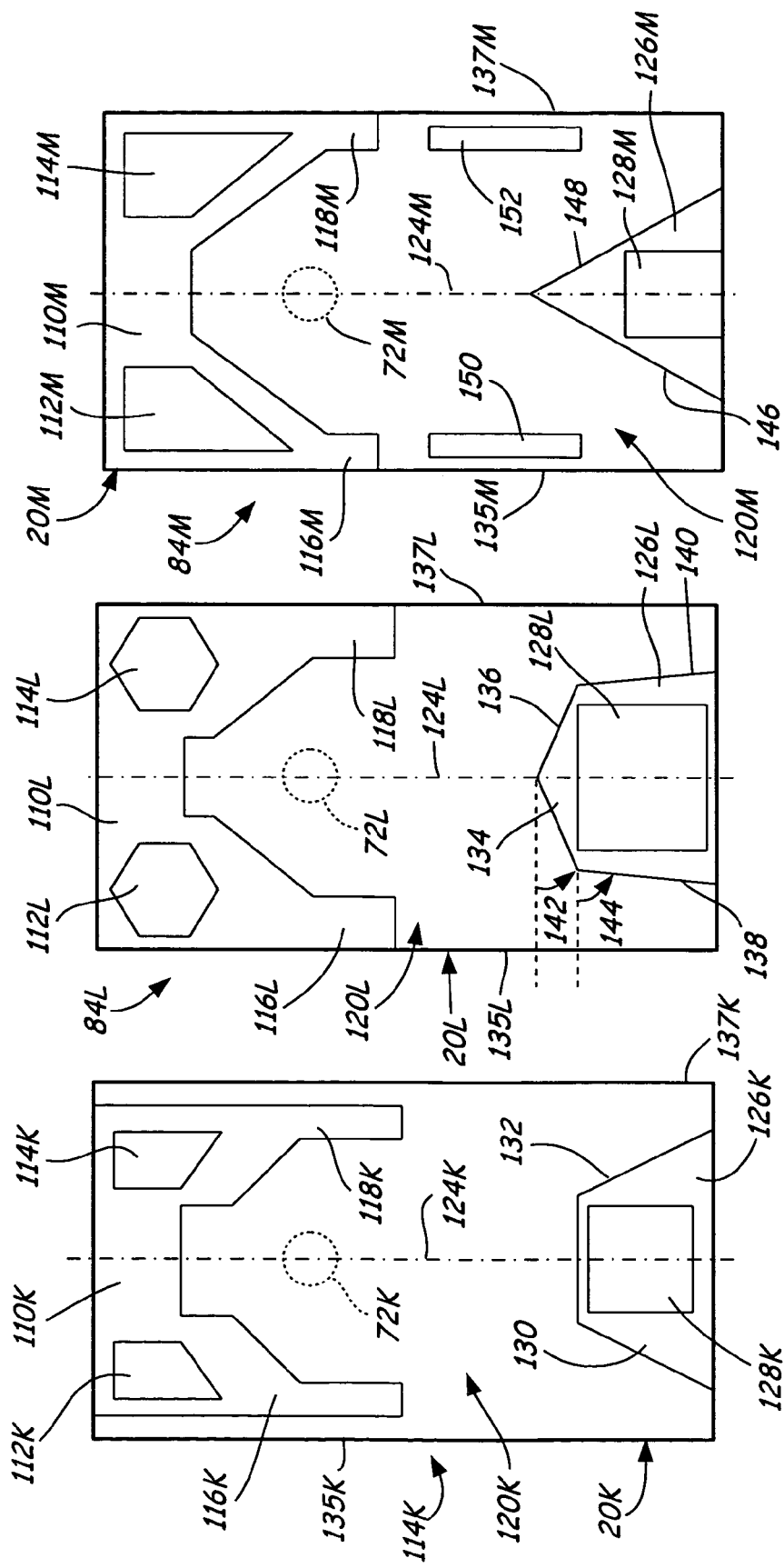

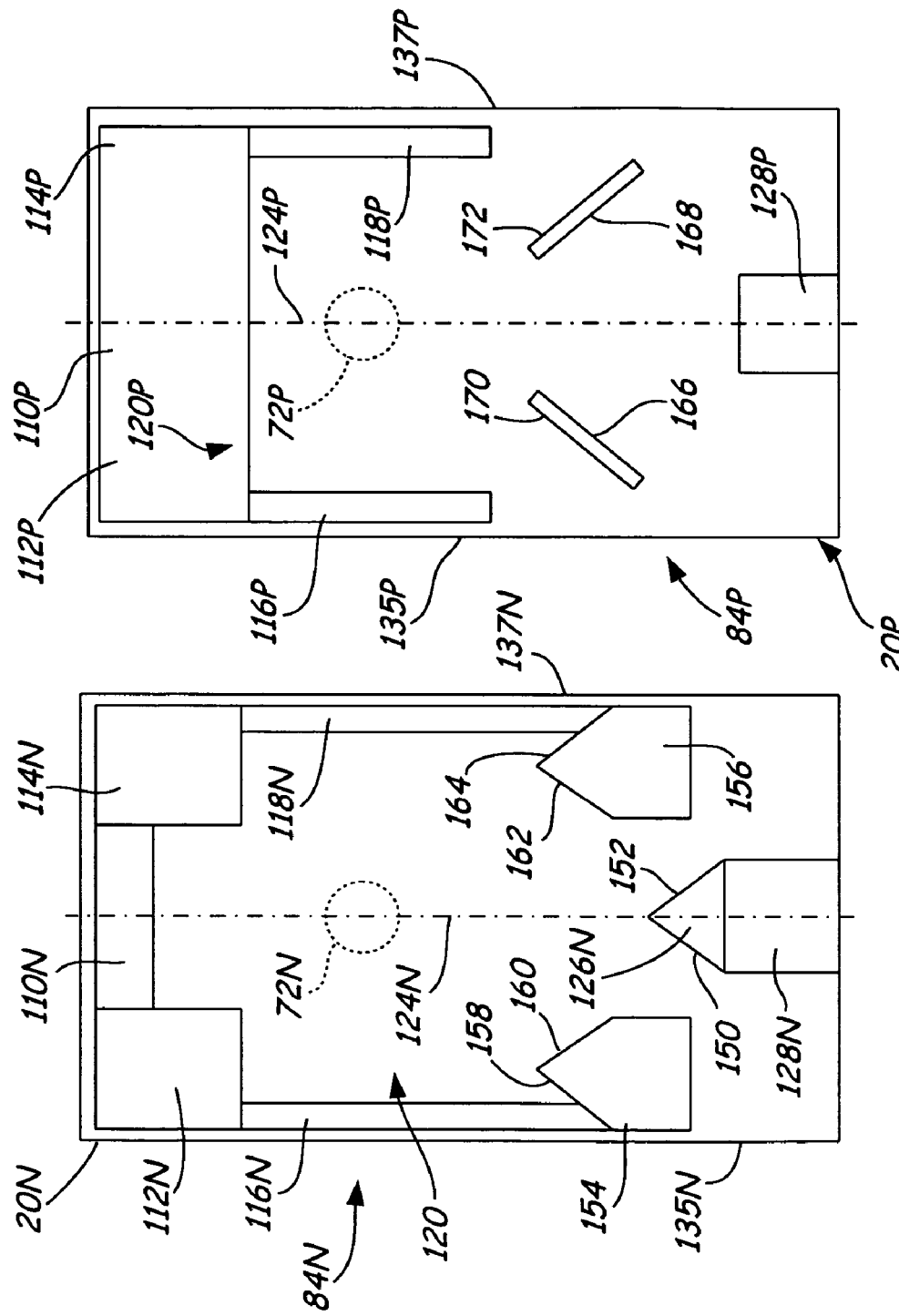

US 7,652,847 B2

MINIMIZED SKEW ANGLE SLIDER

FIELD OF THE INVENTION

The present invention relates generally to suspension assemblies, and as a particular illustration but not by limitation, to suspension assemblies including sliders which minimize skew angle to increase storage density capabilities of data storage systems.

BACKGROUND OF THE INVENTION

Systems such as data storage systems often include a slider involved in reading from and/or writing to a data storage medium. For example, disc drives are one popular form of data storage system. Disc drives use rigid discs that include a storage medium for storage of digital information in a plurality of circular, concentric data tracks. The discs are mounted on a spindle motor which causes the discs to spin and the surfaces of the discs to pass under respective sliders. Such sliders use a fluid such as air to supply an aerodynamic bearing force. The sliders carry data interface heads, such as magnetoresistive heads, which write information to and/or read information from the disc surfaces.

An actuator, such as a rotary actuator, moves each slider from track to track across the surface of a disc under the control, for example, of electronic circuitry. Using a rotary actuator for moving the sliders typically causes a skew angle between the orientation of the suspension assembly, including the suspension, the slider and the head mounted thereon, and the data track upon the disc which is intended to be read or written to by the slider. This skew angle can be significant, for example, up to 15 degrees or more in some data storage systems. This skew angle causes a misalignment between the head of a slider, whether a read/write head, or a separate read or write head, and the data track intended to be read or written to. This results in a loss of performance in writing to or reading the intended data track. This can also cause a corner of the transducer to be positioned over an adjacent data track, causing read or write interference between the intended data track and the unintended, adjacent data track.

Disc drives using magnetoresistive (MR) technology, for example, have become a popular solution for increasing data storage system performance. In particular, MR heads adapted for perpendicular recording, as opposed to longitudinal recording, have become favored for their advantageous function in increasing areal data density. Many data storage systems also use separate transducers for read and write functions. While these features can offer substantial advantages, they also exacerbate the problems resulting from a nontrivial skew angle. For example, in disc drives using MR heads adapted for perpendicular recording, the sensitivity of performance to skew angle is three to five times more severe than for longitudinal recording. This exemplifies the growing problem of skew angle in any type of system involving a suspension assembly including a slider that may be affected by a skew angle in opposing data storage media.

Therefore, a new slider technology for systems incorporating suspension assemblies is highly desired, to solve the problems of skew angle while avoiding tradeoffs with other design criteria.

Embodiments of the present invention provide solutions to these and other problems, and offer other advantages over the prior art.

SUMMARY OF THE INVENTION

One embodiment of the present invention pertains to a suspension assembly comprising a suspension, a slider, and a suspension interface by which the slider is rotatably connected about a yaw axis to the suspension.

Another embodiment of the invention pertains to a slider, including means for operatively suspending the slider from a suspension, and means for exploiting an ambient fluid flow to minimize a skew angle of the slider relative to the ambient fluid flow.

Another embodiment of the invention pertains to a suspension assembly including a suspension and a slider. The suspension includes a slider interface component. The slider includes an aerodynamic surface, and a back surface that comprises a suspension interface component, wherefrom the slider is operatively suspended from the slider interface component of the suspension, providing the slider with substantial freedom of yaw rotation. The aerodynamic surface is thereby adapted to translate a force of an ambient air flow at a skew angle relative to the slider into a torque about the suspension interface which minimizes the skew angle.

Other features and benefits that characterize embodiments of the present invention are explicitly and implicitly apparent upon reading the following detailed description and review of the associated drawings.

BRIEF DESCRIPTION OF THE DRAWINGS

FIG. 7 depicts a back plan view of a slider suspended from a suspension, according to one embodiment.

FIG. 8 depicts a side plan view of a slider suspended from a suspension and opposing a disc, according to one embodiment.

FIG. 9 depicts a back plan view of a slider suspended from a suspension, according to one embodiment.

FIG. 10 depicts a side plan view of a slider suspended from a suspension and opposing a disc, according to one embodiment.

FIGS. 11 through 15 each depict a front plan view of the aerodynamic front surfaces of sliders, according to various embodiments.

DETAILED DESCRIPTION OF ILLUSTRATIVE EMBODIMENTS

Figure 1:
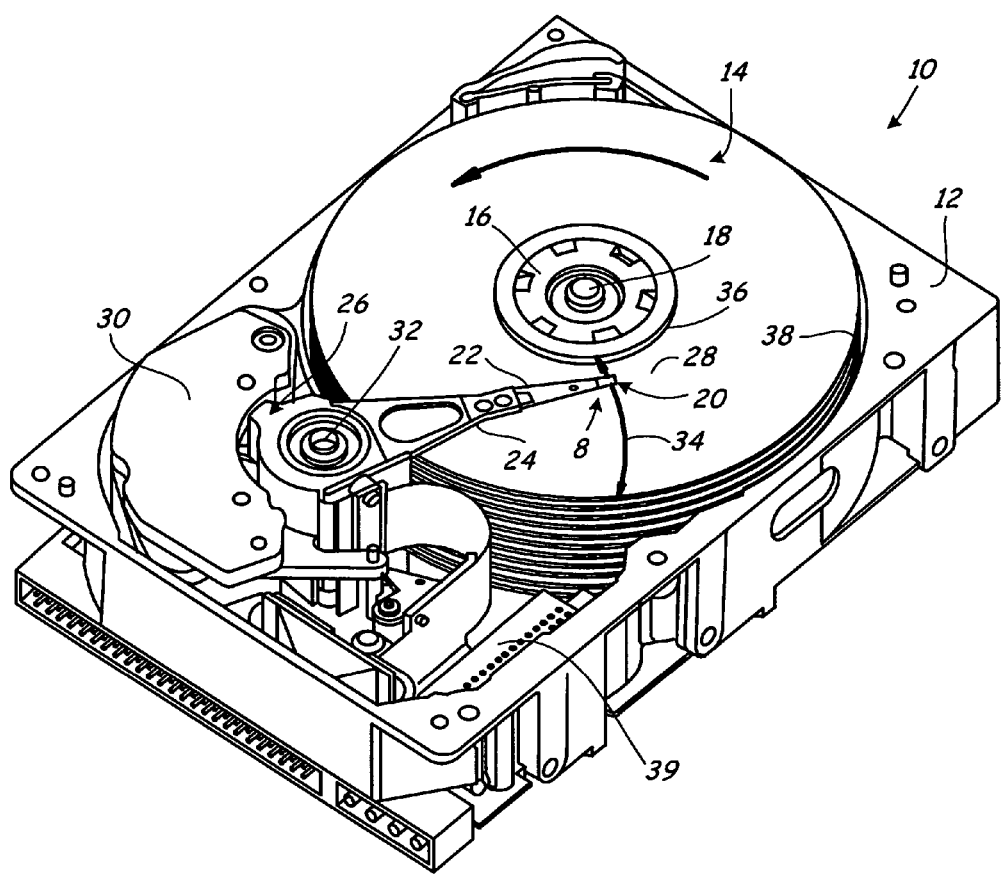
FIG. 1 depicts a perspective view of a data storage system in which an embodiment of the present invention is incorporated.

FIG. 1 is a perspective view of an embodiment of a data storage system incorporating the present invention. Disc drive 10 is one example from the variety of data storage systems to which the present invention is applicable. Disc drive 10 includes a housing with a base 12 and a top cover (not shown). Disc drive 10 also includes a disc pack 14, which is mounted on a spindle motor (not shown) by a disc clamp 16. Disc pack 14 includes a plurality of individual discs which are mounted for co-rotation about central axis 18. Each disc surface has an associated slider 20 which is mounted to disc drive 10 and carries a data interface head (not shown), with read and/or write function, on slider 20 for communication with the disc surface 28, in this illustrative embodiment.

In FIG. 1, representative slider 20 is supported by suspension 22 which in turn is mounted on track accessing arm 24 of actuator 26. Slider 20 and suspension 22 are comprised in suspension assembly 8. Each disc surface is likewise interfaced by a similarly disposed slider (not shown). Suspension 22 supplies a load force to slider 20 which is substantially normal to opposing disc surface 28. The load force counteracts an aerodynamic lifting force developed between slider 20 and disc surface 28 during the rotation of disc pack 14. Actuator 26 is a rotary moving coil actuator and includes a voice coil motor, shown generally at 30. Voice coil motor 30 rotates actuator 26 about pivot shaft 32 to position slider 20 over an intended data track (not shown) along a slider range 34 between a disc inner diameter 36 and a disc outer diameter 38. Voice coil motor 30 operates under control of internal circuitry 39.

Figure 2:
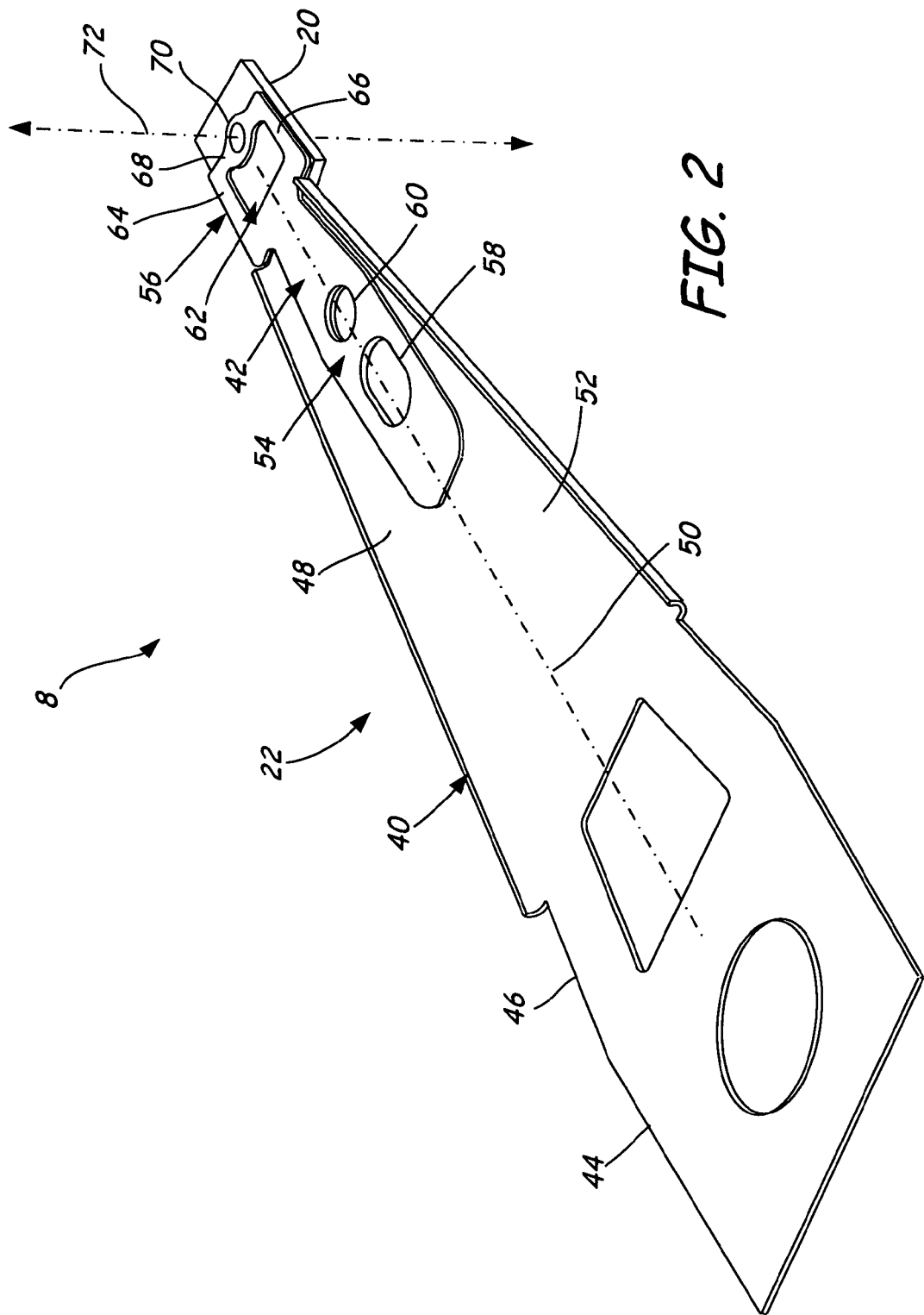
FIG. 2 depicts a perspective view of a suspension, according to an embodiment of the present invention.

FIG. 2 is a perspective view of suspension assembly 8, according to one embodiment. Back surface 52 of suspension 22 is in view. Suspension 22 includes load beam 40 and gimbal 42. Load beam 40 includes mounting portion 44, flexible beam portion 46, rigid beam portion 48 and beam axis 50. Mounting portion 44 is mounted to track accessing arm 24 (shown in FIG. 1). Flexible beam portion 46 supplies a pre-load force to determine the flying height of slider 20. Rigid beam portion 48 transfers the pre-load force from flexible beam portion 46 to slider 20.

Gimbal 42 is attached to back surface 52 of load beam 40. Gimbal 42 includes rearward mounting portion 54 and forward flexure portion 56. Mounting portion 54 has alignment features 58 and 60 which mate with corresponding alignment features in load beam 40 when gimbal 42 is attached to load beam 40. Gimbal 42 can be attached to load beam 40 in a variety of ways, such as by welding or with an adhesive.

Flexure portion 56 includes cutout 62 which forms flexure beams 64 and 66, and cross member 68. Flexure beams 64 and 66 are substantially parallel to beam axis 50 of load beam 40. Cross member 68 is in contact with suspension interface 70, by which slider 20 is suspended from suspension 22 of suspension assembly 8. Suspension interface 70 enables slider 20 to rotate about vertical axis 72, which defines a yaw rotation of the slider. Vertical axis 72, which can also be considered the yaw axis or Z axis of the slider, is substantially the same axis about which a skew angle is measured. Slider 20 is thus rotatably connected about yaw axis 72 to suspension 22.

In traditional head gimbal assemblies, some de minimis slider flexure about a yaw axis occurs, owing merely to the inexorable flexing inherent in any physical object subjected to forces. However, the understanding in the art has typically centered on head gimbal assemblies configured to resist yaw rotation as much as possible. The embodiment of FIG. 2 and other embodiments described and depicted herein illustrate some of the ways in which the present invention is fundamentally distinct and novel in view of such traditional head gimbal assemblies and their de minimis, if any, yaw flexure.

Figure 3:
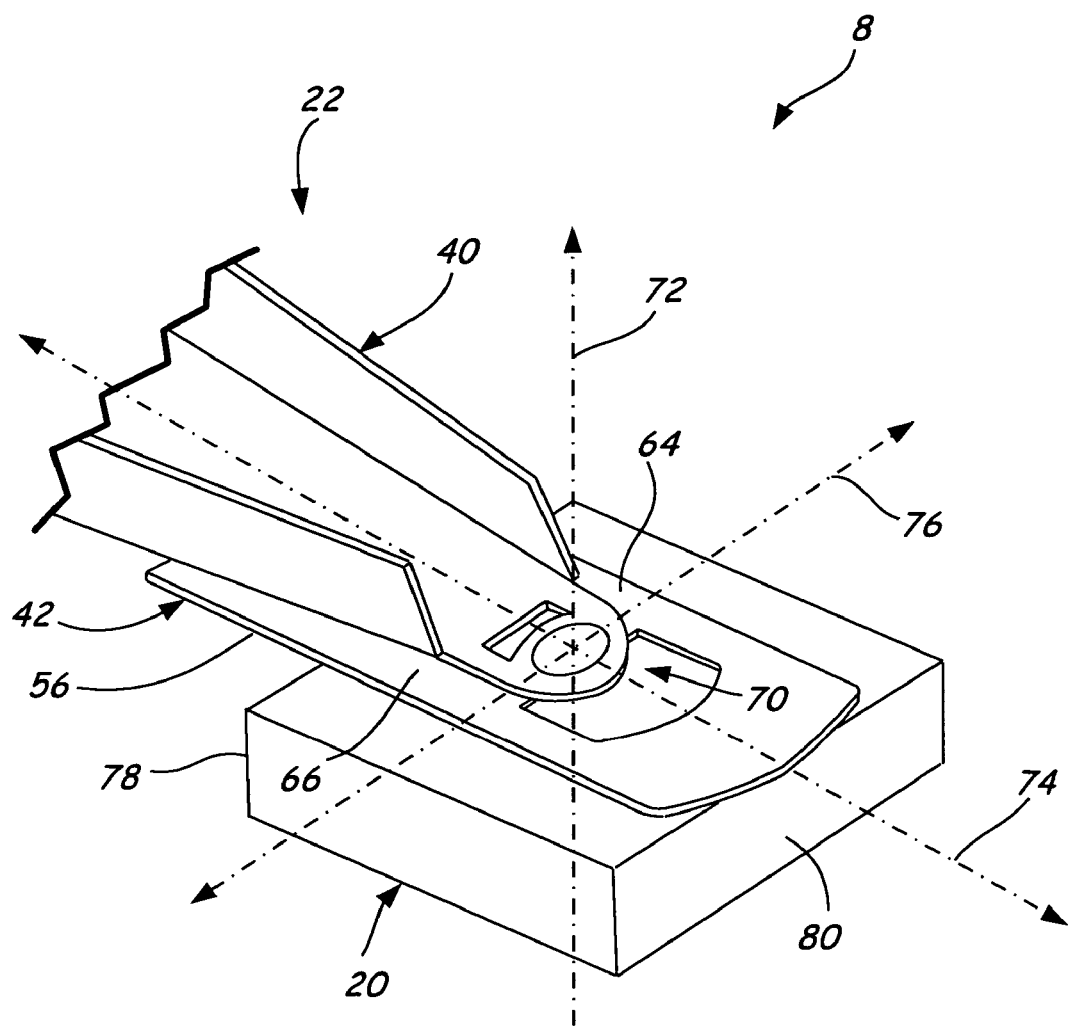
FIG. 3 depicts a perspective view of a slider and a suspension from which the slider is suspended, according to one embodiment.

FIG. 3 is a perspective view of a suspension assembly 8 including a slider 20 rotatably connected from suspension 22, according to one embodiment. Suspension 22 includes load beam 40, gimbal 42, flexure 56 and flexure beams 64 and 66. Slider 20 is operatively suspended from suspension 22 by suspension interface 70, by which the slider has substantial freedom of rotation about vertical, or yaw, axis 72; i.e. slider 20 is rotatably connected by suspension interface 70 about yaw axis 72 to suspension 22.

Slider 20 has leading edge 78 and trailing edge 80. The longitudinal axis 74, also known as the X axis, is depicted. Rotation about the longitudinal axis 74 defines the roll of the slider 20. The lateral, or Y axis 76 is depicted. Rotation of the slider about lateral axis 76 defines the pitch of the slider 20. Rotation about vertical or Z axis 72 defines the yaw of the slider 20. The plane orthogonal to the vertical axis substantially defines the rotational plane in which the skew angle of the slider 20 occurs. More precisely, it is the vertically projected angle between the longitudinal axis of the data interface head (shown in later figures as the example of a transducer) and the opposed data track (shown in later figures) that defines the skew angle. The angle formed by this projection is equivalent to the angle of the slider about the vertical axis, other than nominal effects on the slider such as nominal pitch and roll that distinguish the vertical axis of the slider from an axis orthogonal to the data track.

Figure 4:
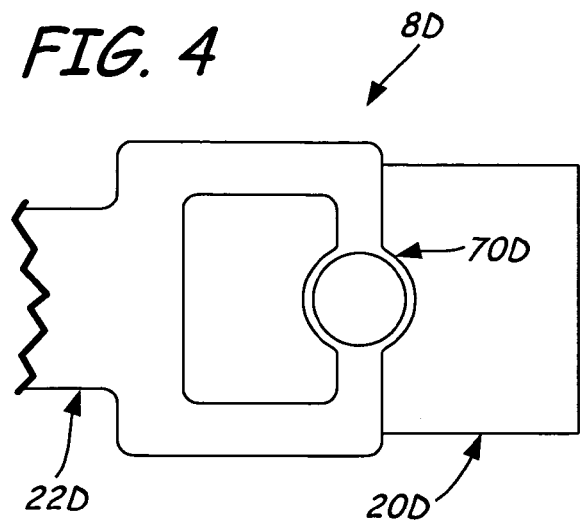
FIG. 4 depicts a back plan view of a slider suspended from a suspension, according to one embodiment.
Figure 5:
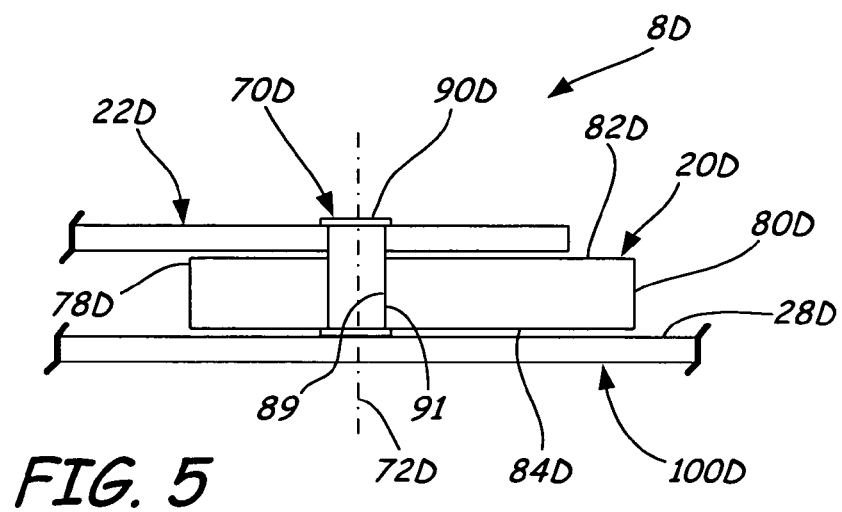
FIG. 5 depicts a side plan view of a slider suspended from a suspension and opposing a disc, according to one embodiment.

FIG. 4 is a top plan view depicting an embodiment of suspension assembly 8D in which slider 20D is rotatably connected to suspension 22D by suspension interface 70D. FIG. 5 is a side view of suspension assembly 8D. Slider 20D is rotatably connected to suspension 22D by suspension interface 70D, which in this embodiment takes the form of swivel 90D, which defines vertical axis 72D. Components (not severally labeled) of suspension interface 70D are comprised in both slider 20D and suspension 22D. Slider 20D also has leading edge 78D and trailing edge 80D, and opposes surface 28D of disc 100D. Slider 20D also has back surface 82D and front aerodynamic surface 84D, which in this embodiment is a front surface. Swivel 90D is affixed to the suspension 22D while being rotatably engaged with the slider 20D, in this embodiment.

The interface between the shaft surface 89 of the swivel 90D and the shaft receiving surface 91 of the slider 20D is adapted for low friction and high, long-term durability. For example, in various embodiments, the composition of shaft surface 89 and/or shaft receiving surface 91 are comprised of sapphire, ruby, glass, diamond-like carbon (DLC), or other comparable substance, and/or the interface between the two surfaces is treated with a lubricant. Other embodiments include variations such as swivel 90 being affixed to slider 20D while being rotatably engaged with suspension 22D.

Figure 6:
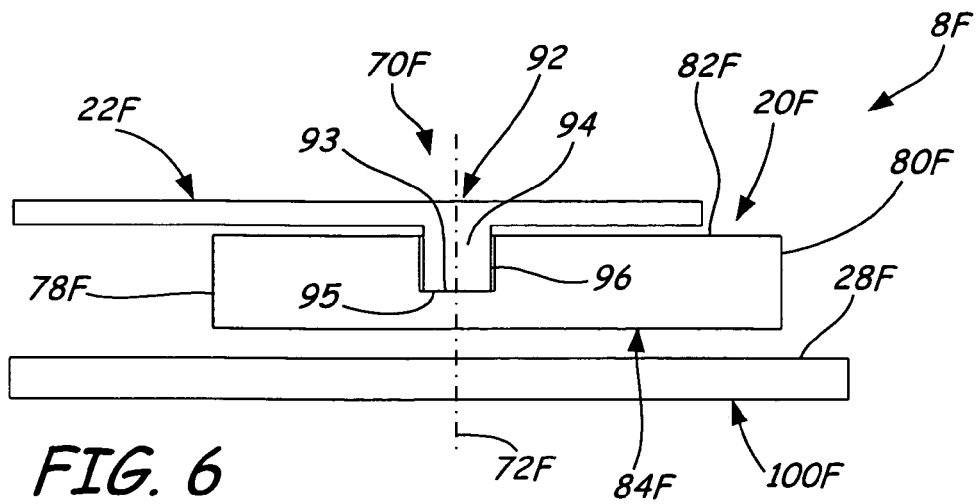
FIG. 6 depicts a side plan view of a slider suspended from a suspension and opposing a disc, according to one embodiment.

FIG. 6 is a side plan view of another embodiment. In suspension assembly 8F, slider 20F is rotatably connected to suspension 22F by suspension interface 70F, which in this case takes the form of pivot joint 92. Pivot joint 92 includes pivot 94 protruding from suspension 22F, and pivot socket 96, disposed on back surface 82F of slider 20F. Pivot 94 is rotatably engaged with pivot socket 96. Pivot 94 is a component of suspension interface 70F by which suspension 22F interfaces with slider 20F, while pivot socket 96 is a component of suspension interface 70F by which slider 20F interfaces with suspension 22F. In other words, pivot 94 is a slider interface component of suspension interface 70F which is comprised in suspension 22F, while pivot socket 96 is a suspension interface component of suspension interface 70F which is comprised in slider 20F. The interface between the pivot surface 93 of the pivot 94 and the pivot receiving surface 95 of the pivot socket 96 is adapted for low friction and high, long-term durability, as detailed above. Pivot joint 92 defines vertical axis 72F. Slider 20F also has front surface 84F, leading edge 78F, and trailing edge 80F. Front surface 84F opposes surface 28F of disc 100F.

Some embodiments of the suspension assembly include active control mechanisms to rotate the slider to minimize skew angle of the slider relative to an ambient air flow, in place of or in tandem with passive, aerodynamically governed mechanisms for minimizing skew angle. For example, in an alternative embodiment corresponding to suspension assembly 8F of FIG. 6, a photolithographically defined thin film coil (not shown) is disposed on pivot surface 93 of pivot 94, and conductively connected to internal circuitry 39 (depicted in FIG. 1). A magnetic material (not shown) is disposed on pivot receiving surface 95 of the pivot socket 96. Internal circuitry 39 includes means for measuring and/or modeling skew angle based on known properties of the interaction of suspension 22F with disc 100F.

As the track accessing arm 24 (depicted in FIG. 1) and suspension 22F rotate back and forth across the surface of disc 100F during normal operation of the disc drive 10 (depicted in FIG. 1), internal circuitry 39 controls a voltage through the coil on pivot surface 93, which exerts a torque on the magnetic material on pivot receiving surface 95 and thereby on the slider 20F. The voltage and consequent torque are applied to rotate slider to minimize the skew angle as measured and/or modeled by internal circuitry 39 and any other associated system components. This exemplifies the various similar active skew angle minimizing controls that occur in different embodiments, including various forms of microactuators, piezoactuators, and various mechanical correction means.

FIG. 7 is another embodiment in which suspension assembly 8G includes slider 20G rotatably connected to suspension 22G by suspension interface 70G, which in this embodiment takes the form of a dial 98.

FIG. 8 is a side plan view of suspension assembly 8G. Slider 20G is suspended by suspension interface 70G, which takes the form of a dial 98 which is operatively connected with the back side 82G of slider 20G and is adapted for low friction and high, long-term durability. Dial 98 defines vertical axis 72G. Front surface 84G of slider 20G opposes disc surface 28G of disc 100G. Slider 20G also has leading edge 78G and trailing edge 80G.

FIG. 9 is another embodiment in which suspension assembly 8I includes slider 20I rotatably connected to suspension 22I by suspension interface 70I. In this embodiment, suspension interface 70I includes swivel 90I, as well as load point button 102 (depicted in outline) which protrudes from the suspension toward the back surface 82I of slider 20I, and arc-shaped load recess track 104 (depicted in outline), disposed on back surface 82I of slider 20I, and enabled to receive load point button 102. Load point button 102 is thereby enabled to translate back and forth along load recess track 104, as slider 20I rotates about vertical axis 72I defined by swivel 90I.

The interface between load point button 102 and load recess track 104 is adapted for low friction and high, long-term durability. For example, in various embodiments, the composition of load point button 102 and/or load recess track 104 are comprised of sapphire, ruby, glass, diamond-like carbon (DLC), or other comparable substance, and the interface between the two surfaces is treated with a lubricant.

FIG. 10 depicts another embodiment of suspension assembly 8I, wherein slider 20I is rotatably connected to suspension 22I by suspension interface 70I, which includes swivel 90I, load point button 102, and load recess track 104. Load point button 102 is enabled to translate along load recess track 104 as slider 20I rotates about vertical axis 72I defined by swivel 90I. Load recess track 104 is disposed in an arc shape along the back surface 82I of slider 20I. The aerodynamic front surface 84I of slider 20I opposes disc surface 28I of disc 100I. Slider also has leading edge 78I and trailing edge 80I.

Many other configurations and embodiments, and particularly of the suspension interface, similar to those depicted in FIGS. 4-10 are encompassed in the present invention. For instance, the pivot joint, swivel and dial depicted are representative of operative couplings between the slider and the suspension capable of defining a vertical axis about which the slider is enabled to rotate. Furthermore, other orientations of both a coupling defining a vertical axis, and a separate load imparting interface are also envisioned, an example of which is depicted with load button 102 and load recess track 104. Other representative examples include suspension interfaces having a swivel, pivot joint, or similar interface disposed closer to the trailing edge of a slider, and a separate load imparting interface disposed closer to the leading edge of a slider.

FIG. 11 depicts an embodiment of an aerodynamic front surface 84K of a slider 20K. Slider 20K has front surface 84K, which includes cavity dam 110K, leading bearing surfaces 112K and 114K, side rails 116K and 118K, central cavity 120K, vertical axis 72K, longitudinal centerline 124K, and trailing vertical stabilizer 126K which forms a trailing step, upon which trailing bearing surface 128K is disposed. The sides of trailing vertical stabilizer 126K form first and second sweepback surfaces 130 and 132. Front surface 84K also has left side 135K and right side 137K.

A sweepback surface is a vertical surface of a vertical stabilizer with a non-zero sweepback angle. A surface is vertical if it is approximately parallel to the vertical axis, e.g. 72K of a slider, e.g. 20K, or otherwise if the surface's projection on the vertical axis is significant relative to its projection on the plane orthogonal thereto, or the surface is otherwise enabled to deflect ambient fluid flow to cause a torque on the slider. Therefore, in some embodiments a sweepback surface is approximately parallel to the vertical axis, e.g. 72K, for example, as close to parallel as is reasonably feasible under nominal manufacturing tolerances; while in other embodiments, a sweepback surface has a substantially sloped form so that it includes a significant longitudinal and/or lateral projection as well as a significant vertical projection. This is particularly the case for surfaces intended to play a role in controlling pitch and/or roll as well as yaw.

FIG. 12 depicts another embodiment of an aerodynamic front surface of a slider. Slider 20L includes aerodynamic front surface 84L which includes cavity dam 110L, leading bearing surfaces 112L and 114L, side rails 116L and 118L, central cavity 120L, vertical axis 72L, longitudinal centerline 124L, trailing vertical stabilizer 126L, and vertical stabilizer 126L upon which trailing bearing surface 128L is disposed. Front surface 84L also has left side 135L and right side 137L.

Vertical stabilizer 126L also has shallow sweepback surfaces 134 and 136, and steep sweepback surfaces 138 and 140. Angle 142 is the sweepback angle of sweepback surface 134, relative to a lateral direction. Sweepback angle 144 defines the sweepback angle of sweepback surface 138 relative to a lateral direction. "Sweepback angle" is a term of art in aerodynamics, and is defined as measured from a lateral direction, such that a surface with a sweepback angle of zero degrees is substantially perpendicular to the direction of motion and of fluid flow, i.e. flow of an ambient fluid such as air or argon for example, while a sweepback angle of ninety degrees indicates substantially parallel to the direction of motion or fluid flow, i.e. a fin surface. Sweepback angle 142 is depicted here to be about 10 degrees, while sweepback angle 144 is depicted here to be about 80 degrees. These are representative of a wide range of possible sweepback angles of sweepback surfaces of the aerodynamic front surface, which could possibly be any angle greater than zero degrees up to 90 degrees.

FIG. 13 depicts another embodiment of an aerodynamic front surface of a slider. Slider 20M has front surface 84M, which has cavity dam 110M, leading bearing surfaces 112M and 114M, side rails 116M and 118M, central cavity 120M, vertical axis 72M, longitudinal centerline 124M, and trailing vertical stabilizer 126M including trailing bearing surface 128M and sweepback surfaces 146 and 148. Front surface 84M also includes substantially longitudinal fins 150 and 152, which have approximately ninety-degree sweepback angles. Front surface 84M also has left side 135M and right side 137M.

FIG. 14 depicts another embodiment of an aerodynamic front surface of a slider. Slider 20N has front surface 84N, which has cavity dam 110N, leading bearing surfaces 112N and 114N, side rails 116N and 118N, central cavity 120N, vertical axis 72N, longitudinal centerline 124N, and trailing vertical stabilizer 126N having trailing bearing surface 128N. Trailing vertical stabilizer 126N also includes sweepback surfaces 150 and 152. Front surface 84N also includes trailing side bearing surfaces 154 and 156, and left side 135N and right side 137N. Adjacent to trailing side bearing surface 154 are sweepback surfaces 158 and 160. Adjacent to trailing side bearing surface 156 are sweepback surfaces 162 and 164.

FIG. 15 depicts another embodiment of an aerodynamic front surface of a slider. Slider 20P has aerodynamic front surface 84P, which has cavity dam 110P, leading bearing surfaces 112P and 114P, side rails 116P and 118P, central cavity 120P, vertical axis 72P, longitudinal centerline 124P and trailing bearing surface 128P. Front surface 84P also includes diagonal vertical stabilizers 166 and 168, and left side 135P and right side 137P. Diagonal vertical stabilizer 166 includes sweepback surface 170, while diagonal vertical stabilizer 166 includes sweepback surface 172.

Figure 16:
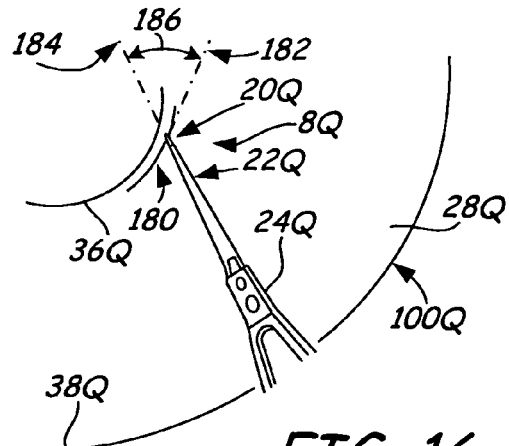
FIG. 16 depicts a back plan view of a track accessing arm, suspension and slider, opposing a disc, and a data track on the disc surface targeted by the slider, according to one embodiment.

FIG. 16 depicts an embodiment incorporated in a disc drive, as an example of a data storage system. Suspension assembly 8Q includes slider 20Q and suspension 22Q from which slider 20Q is rotatably connected by suspension interface 70Q. Suspension assembly 8Q is itself coupled to track accessing arm 24Q. Track accessing arm 24Q bears suspension 22Q and slider 20Q in opposition to disc 100Q. Disc 100Q has opposing surface 28Q, inner diameter 36Q, outer diameter 38Q and a plurality of data tracks that run substantially tangentially along disc surface 28Q of which individual data track 180 is representative. The longitudinal orientation of a data interface head such as a magnetoresistive head adapted for perpendicular recording (not shown) disposed upon slider 20Q is defined by head longitudinal axis 184. The tangential direction of data track 180 opposed to slider 20Q at a given point in time defines a tangential axis 182. The angle formed between head longitudinal axis 184 and tangential axis 182 defines a skew angle 186. During operation, the rotation of the disc causes a fluid flow, such as an air flow, ambient to the disc surface and the slider. The air flow is essentially parallel to the data tracks. Therefore, the tangential axis 182 can also be defined as parallel to the ambient air flow, which will be equivalent to parallel to the opposed data track to within an excellent approximation that is suitable for engineering design purposes.

Although particular embodiments such as this are described in reference to a disc drive as a particular form of data storage system, the present invention has various other embodiments with application to other data storage systems involving media including magnetic, magnetoresistive, optical, mechanical, and other data technologies, in disc, tape, floppy, and other mechanical formats. For example, while the embodiment above is described with reference to a magnetoresistive head adapted for perpendicular recording, other types of heads are comprised in alternative embodiments, such as a magnetoresistive head adapted for longitudinal recording. Similarly, in other embodiments a slider is disposed opposite a surface hosting locations defined in terms other than data tracks, wherein the present invention is also useful in rotating to minimize a skew angle relative to an ambient fluid flow.

Figure 17:
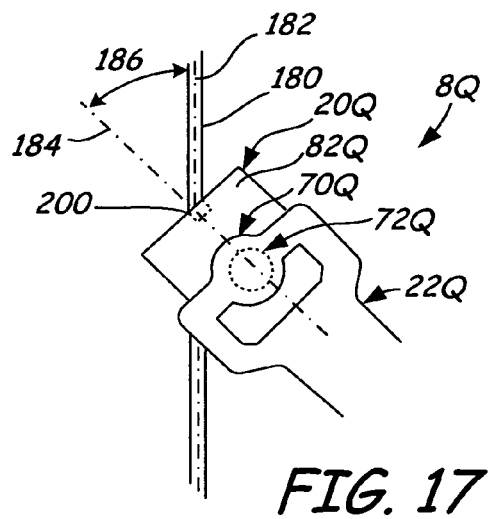
FIG. 17 depicts a back plan view of a slider suspended from a suspension, and interfacing with a data track on the disc surface, according to one embodiment.

FIG. 17 is a closer back plan view of suspension assembly 8Q including slider 20Q and suspension 22Q. Slider 20Q is rotatably connected to suspension 22Q by suspension interface 70Q, which is disposed upon the back surface 82Q of slider 20Q. Suspension interface 70Q defines vertical axis 72Q (depicted as a circle in outline, to indicate being orthogonal to the page). Magnetoresistive head 200 (depicted in outline), an example of a data interface head, is disposed upon the front surface of slider 20Q, and opposes data track 180. At this scale data track 180 appears relatively straight, although on a larger scale it is shown to curve according to the dimensions of disc 100Q. Skew angle 186 is apparent here between head longitudinal axis 184 and tangential axis 182.

In this embodiment, head longitudinal axis 184 is substantially parallel to longitudinal axis of the slider (not shown) and offset therefrom by a vertical displacement. These two axes are distinguished wherein the longitudinal axis of the slider passes through the slider and defines the roll axis thereof, while head longitudinal axis 184 passes through magnetoresistive head 200. In other embodiments, a data interface head is set away from the longitudinal centerline of the aerodynamic front surface, so that the data interface head longitudinal axis would be offset both vertically and laterally from the longitudinal axis of the slider. The orientation of slider 20Q in FIG. 17 is shown previous to any corrective action to compensate for skew angle.

Figure 18:
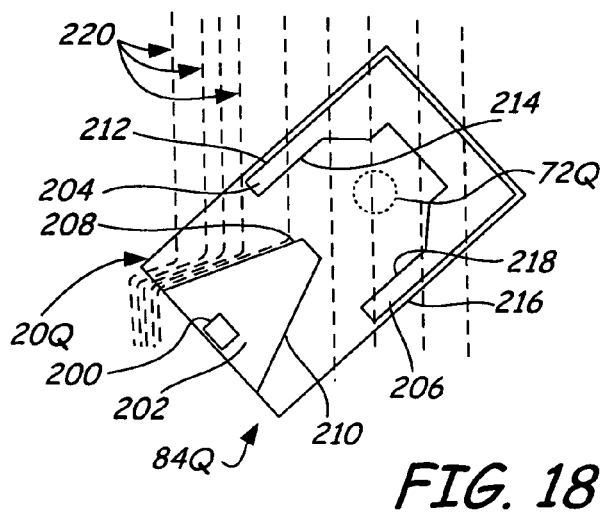
FIG. 18 depicts a front plan view of an aerodynamic front surface of a slider and an air flow interacting with the front surface, according to one embodiment.

FIG. 18 depicts an embodiment corresponding with the depiction of FIG. 17. FIG. 18 depicts the aerodynamic front surface 84Q of slider 20Q, having vertical stabilizers 202, 204 and 206. Vertical stabilizer 202 has sweepback surfaces 208 and 210. Vertical stabilizer 204 is a substantially longitudinal fin having fin surfaces 212 and 214. Vertical stabilizer 206 is also a substantially longitudinal fin having fin surfaces 216 and 218. Aerodynamic front surface includes vertical axis 72Q and other features similar to those depicted above.

An ambient air flow 220 is depicted interacting with the aerodynamic front surface 84Q. Ambient air flow 220 is an example of a type of fluid flow that may be ambient to slider 20Q. Other fluids having similar hydrodynamic qualities would cause a similar interaction. The ambient air flow 220 impacts vertical stabilizer surfaces, including sweepback surface 208, and fin surfaces 212 and 218, of aerodynamic front surface 84. This creates a much greater air pressure against these stabilizer surfaces than against other surfaces of the aerodynamic front surface. For example, the pressure against a vertical stabilizer surface can reach up to 15 times normal atmospheric air pressure or more, during normal operation of a data storage system such as a disc drive. The ambient air flow 220 thereby exerts a particularly strong force against vertical stabilizer surfaces 208, 212, and 218.

Since slider 20Q has substantial freedom of yaw rotation, that is, rotation about the vertical axis 72Q, these forces will translate into a torque on slider 20Q about vertical axis 72Q in the direction that will minimize the skew angle. In embodiments such as this one, the greater the skew angle, the greater the forces exerted upon the vertical stabilizer surfaces 208, 212 and 218 by the ambient air flow 220, and therefore the greater the torque on the slider 20Q about the vertical axis 72Q.

Since it is the action of the air flow that causes the torque, it is the skew angle as defined between the longitudinal axis of the slider and the tangential axis of the air flow that is minimized. This is generally equivalent to the skew angle between the read/write head or separate read head or write head disposed on the slider, and the opposing data track of the disc surface which causes the air flow. Minimizing the skew angle between the head and the opposing data track is a purpose of the invention.

Ambient air flow 220 is depicted impacting aerodynamic front surface 84Q at an angle corresponding to the skew angle. As the slider 20Q rotates about vertical axis 72Q in response to the torque, the skew angle is reduced. The torque is thereby also reduced as the skew angle reduces, with the torque approaching zero as skew angle approaches zero.

It is desirable to use an embodiment which optimizes the capability of the aerodynamic front surface to translate the ambient air flow into a high torque that will reduce the skew angle as rapidly as possible, consistent with other performance objectives. For instance, studies have indicated that a vertical stabilizer surface with a sweepback angle of 75 degrees offers a far greater amount of torque relative to a skew angle than does a vertical stabilizer surface with a sweepback angle of 90 degrees (which may also be considered a fin surface) relative to the skew angle; and that a vertical stabilizer surface with a sweepback angle of 60 degrees offers significantly more torque relative to the skew angle than a vertical stabilizer surface of 75 degrees. On the other hand, a fin surface may be desirable, for instance, by providing some torque per skew angle while inducing less drag on the slider than an angled sweepback surface, as one example of a tradeoff among various performance objectives.

It is also desirable to use an embodiment with a front surface adapted to avoid an over-rotation of slider 20Q. Over-rotation occurs when the torque caused by an ambient air flow causes the slider 20Q to rotate about vertical axis 72Q past what is required to reduce the skew angle to zero degrees, and instead causes a new skew angle on the other side of the contemporary tangential axis. It is therefore desired for the aerodynamic front surface to be enabled to cause a torque that rises rapidly as a function of skew angle within a small variation of skew angle from zero. This will help ensure that the rotation of the slider caused by the torque will be damped, and not overcompensate for the skew angle. Studies have indicated that sweepback angles significantly below 90 degrees provide such a dampening, high change in torque close to zero skew angle, to prevent such overcompensation.

Figure 19:
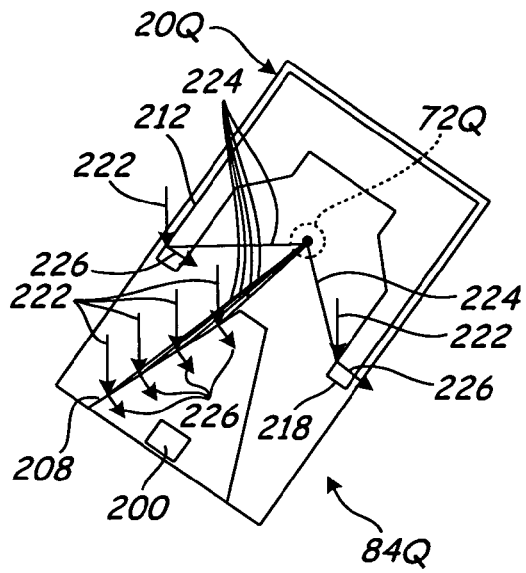
FIG. 19 depicts a front plan view of an aerodynamic front surface of a slider, including a force diagram depicting force and torque resulting from the interaction of an ambient air flow with the aerodynamic front surface, according to one embodiment.

FIG. 19 depicts an embodiment of an aerodynamic front surface 84Q of slider 20Q, corresponding with the embodiment depicted in FIG. 18. FIG. 19 depicts a force diagram version of the depiction of FIG. 18. In FIG. 19, vectors 222 represent components of force exerted by the ambient air flow against stabilizer surfaces 208, 212, 218, of front surface 84Q. Radii 224 are radii from the vertical axis 72Q (depicted now with an added central point to show the radial center more precisely) to the points on vertical stabilizers surfaces 208, 212, 218 upon which forces 222 are imposed. The resulting torque (not shown) is oriented orthogonally to the force vectors and radii at the vertical axis 72, and (as an axial vector, i.e. a pseudovector) is oriented upward or "out of the page". Vectors 226 represent the components of force normal to vertical stabilizer surfaces 208, 212, 218.

Figure 20:
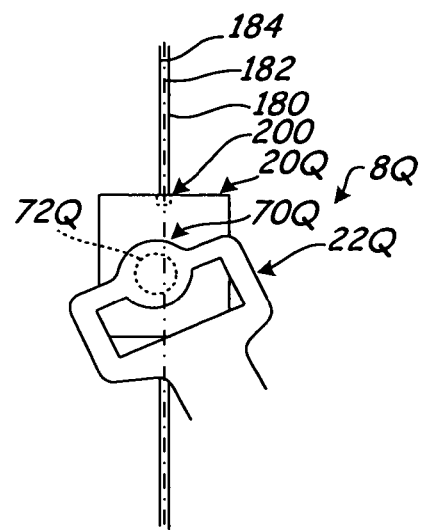
FIG. 20 depicts a back plan view of a slider suspended from a suspension, interfacing with a data track of the disc surface, according to one embodiment.

FIG. 20 depicts another embodiment of suspension assembly 8Q corresponding to the depiction of FIG. 17. Suspension assembly 8Q includes suspension 22Q and slider 20Q, which is rotatably connected to suspension 22Q by suspension interface 70Q which defines vertical axis 72Q. Slider 20Q is depicted in an orientation of minimized skew angle, after having been subjected to an ambient air flow and its resultant torque upon interaction within the aerodynamic front surface. Magnetoresistive head 200 (shown in outline) is now oriented in alignment with data track 180, such that head longitudinal axis 184 and tangential axis 182 are superimposed together, with zero angle between them. The skew angle has therefore been minimized to zero in this orientation. The operation of the slider, passively interacting with the ambient air flow, minimizes the skew angle.

In practice, achieving a skew angle of precisely zero is rare, particularly with the track accessing arm and suspension rotating back and forth across the surface of data storage media during normal operation of the data storage system. The orientation of the slider 20Q relative to ambient air flow is therefore likely to be changing frequently during normal operations. It may therefore be rare, during normal operation, for the slider to remain oriented to the ambient air flow in the same orientation over long periods of time. Rather, it is expected that the slider will often significantly reduce the skew angle, perhaps not to zero, but to a fraction of what would be the case with a slider fixed rigidly to the suspension, as with many traditional data storage systems.

For example, exemplary embodiments are envisioned in which the slider has a typical maximum operating skew angle relative to the ambient air flow of two to three degrees. Other embodiments are contemplated in which the typical maximum skew angle is in a greater or lesser range than this. This represents a substantial improvement over a fixed slider skew angle, which may have a maximum of up to 15 degrees or more in different traditional data storage systems. In other words, embodiments such as that of FIG. 20 are capable of correcting up to fifteen degrees of skew angle in either direction, as an illustrative example. Other maximum corrective angles above or below fifteen degrees are featured in different embodiments. Therefore, to minimize the skew angle is to reduce substantially or significantly the skew angle, the details of which depend on the specific embodiment.

Figure 21:
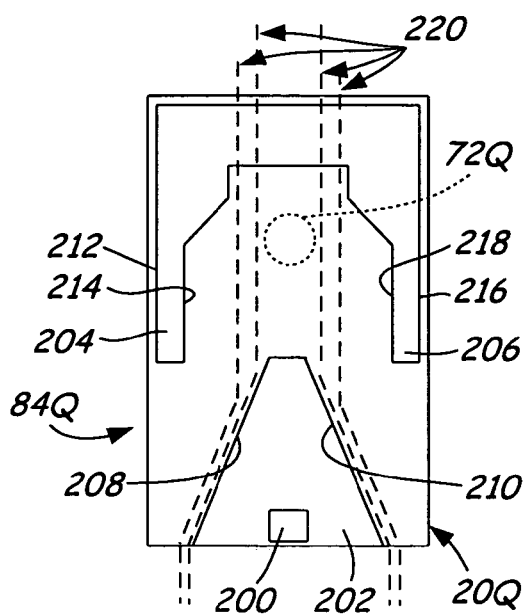
FIG. 21 depicts a front plan view of an aerodynamic front surface and an air flow interacting therewith, according to one embodiment.

FIG. 21 is another depiction of front slider surface 84Q corresponding with the embodiments depicted in FIGS. 17-20. FIG. 21 is particularly analogous to FIG. 18, but wherein FIG. 21 depicts the aerodynamic disc-opposable service relative to the ambient air flow after a skew angle correcting torque has been achieved. Ambient air flow 220 impacts sweepback surfaces 208 and 210 symmetrically, such that the forces and torques exerted against the stabilizer surfaces 208 and 210 about vertical axis 72Q are balanced with each other and are in equilibrium. This demonstrates that the aerodynamic front surface creates a torque that has a substantially proportional relation to the skew angle, such that any skew angle causes a negative feedback torque on the slider 20Q which drives the orientation of the slider 20Q toward the equilibrium in which opposing torques are balanced and the skew angle is zero.

Different embodiments of the aerodynamic front surface and the vertical stabilizer surfaces disposed thereon have different relations between skew angle and torque. In the embodiment of FIG. 21 and certain other preferred embodiments, this skew angle/torque relation is substantially proportional, meaning that the torque is generally higher with higher skew angle, at least up to the maximum skew angle specified for normal operating conditions or close thereto. This relation may be exponential, logarithmic, or otherwise not directly, arithmetically proportional.

For instance, studies indicate that a fin surface, i.e. a vertical stabilizer surface that is substantially parallel, to within nominal manufacturing tolerances in the industry, to the longitudinal centerline of the front surface, is characterized by a relation in which the torque rises roughly exponentially but very slowly as a function of skew angle. In this case, there is little or negligible torque or rise in torque within small skew angles; nevertheless, the torque still rises in a substantially proportional relation to skew angle.

As another example, some embodiments are envisioned which include asymmetrical aerodynamic features on the front surface, designed particularly to compensate for differential influences on the roll of the slider, for example. In such a case, the relation between torque and skew angle is asymmetrical, depending on which side of the tangential axis the skew angle is on. While the vertical stabilizer surfaces in symmetrical embodiments are disposed in symmetrical opposition with one another about the longitudinal centerline, to within nominal manufacturing tolerances in the industry, the vertical stabilizer surfaces in an asymmetrically designed disc-opposing surface will have departures from such symmetry sufficient to meet the design objectives, such as to improve the roll properties of the slider, or to account for differences in fluid flow characteristics from one side of the aerodynamic front surface to the other, for example, faster fluid flow on the side of the slider closer to the outer diameter of a disc. The vertical stabilizer surfaces are disposed in substantially symmetric opposition to each other about the longitudinal centerline in that they are symmetric but for the differences involved in such correction factors and nominal manufacturing techniques, and the relation between skew angle and torque is substantially proportional.

In other embodiments, the torque actually peaks at a skew angle before the maximum specified skew angle, but is still oriented in the direction to minimize the skew angle. This means the minimizing torque would have a local minimum at a non-zero skew angle. However, the equilibrium orientation angle of the slider would remain without any minima away from zero skew angle. Such an aerodynamic front surface may result from compromise between optimizing skew angle minimization with other design goals, such as pitch, roll, and vertical height properties, for example. Because the torque, despite having local minima, still always acts to minimize the skew angle, these embodiments are also envisioned.

Figure 22:
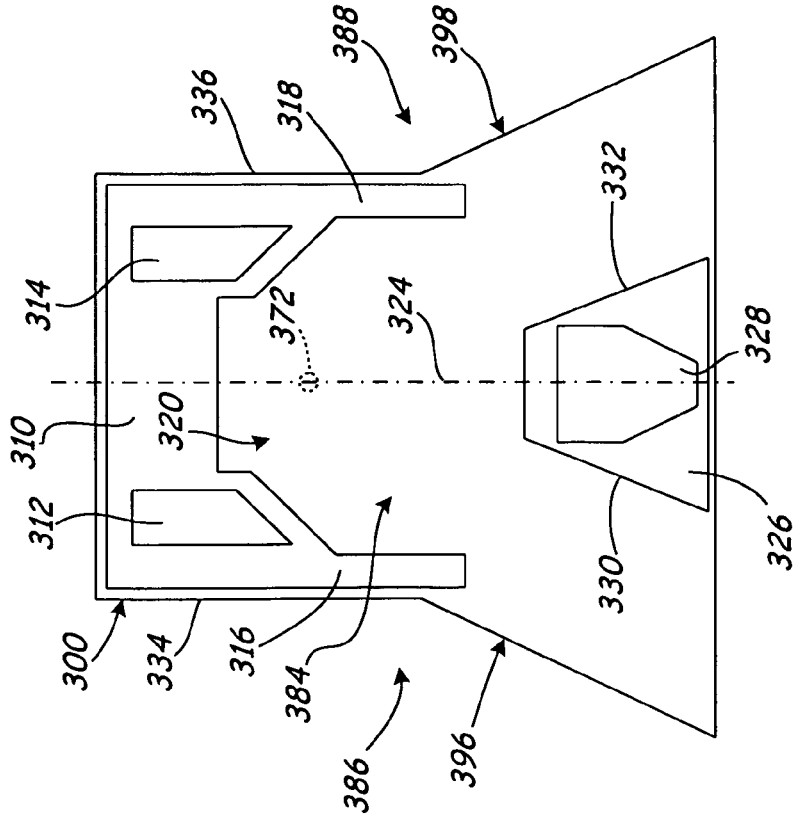

FIG. 22 is an embodiment of slider 300 including front aerodynamic surface 384 disposed on the front of slider 300, opposite to the back surface (not shown) of slider 300, and side aerodynamic surfaces 386 and 388 disposed on the lateral sides of slider 300, lateral to the back surface (not shown) of slider 300. Slider 300 also includes cavity dam 310, leading bearing surfaces 312 and 314, side rails 316 and 318, central cavity 320, vertical axis 372, longitudinal centerline 324, and trailing vertical stabilizer 326 which forms a trailing step, upon which trailing bearing surface 328 is disposed. The sides of trailing vertical stabilizer 326 form first and second sweepback surfaces 330 and 332. Front aerodynamic surface 384 also has left side 334 and right side 336, in part contiguous with side aerodynamic surfaces 386 and 388, respectively. Sweepback surfaces 396 and 398 are disposed substantially on side aerodynamic surfaces 386 and 388, respectively. Side sweepback surfaces 396 and 398 are adapted to use the ambient fluid flow at the skew angle to cause a torque on slider 300, thereby contributing to enabling slider 300 to rotate to minimize the skew angle, similarly to the description above for other sweepback surfaces. In other words, slider 300 comprises a shape configured such that the ambient fluid flow at the skew angle causes a torque on the slider 300.

Figure 23:
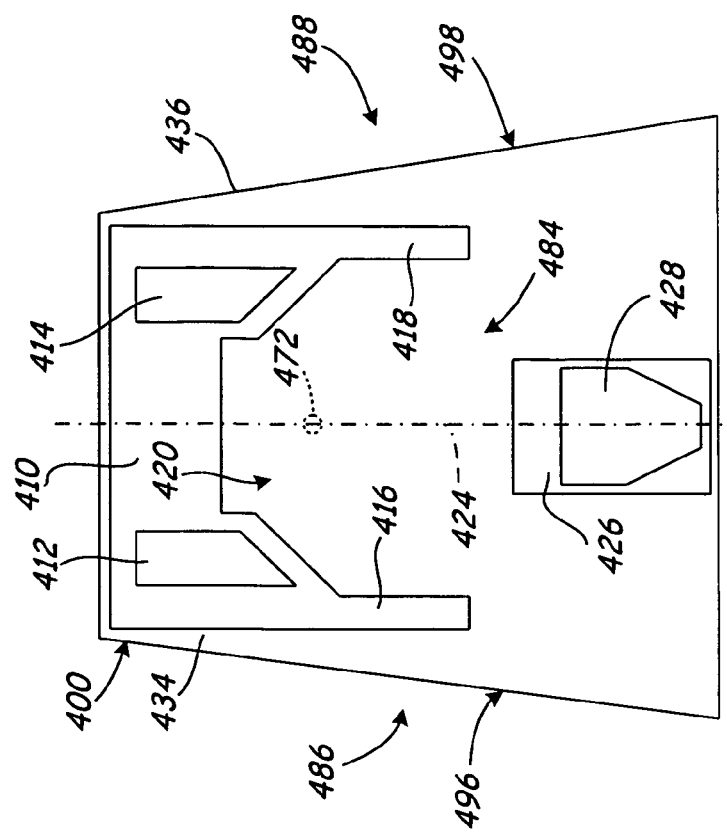
FIGS. 22 and 23 each depict a front plan view of a slider with aerodynamic surfaces thereof, according to various embodiments.

FIG. 23 is an embodiment of slider 400 including front aerodynamic surface 484 disposed on the front of slider 400, opposite to the back surface (not shown) of slider 400, and side aerodynamic surfaces 486 and 488 disposed on the lateral sides of slider 400, lateral to the back surface (not shown) of slider 400. Slider 400 also includes cavity dam 410, leading bearing surfaces 412 and 414, side rails 416 and 418, central cavity 420, vertical axis 472, longitudinal centerline 424, and trailing vertical stabilizer 426 which forms a trailing step, upon which trailing bearing surface 428 is disposed. Front aerodynamic surface 484 also has left side 434 and right side 436, in part contiguous with side aerodynamic surfaces 486 and 488, respectively. Sweepback surfaces 496 and 498 are disposed substantially on side aerodynamic surfaces 486 and 488, respectively. Side sweepback surfaces 496 and 498 are adapted to use the ambient fluid flow at the skew angle to cause a torque on slider 400, thereby contributing to enabling slider 400 to rotate to minimize the skew angle, similarly to the description above for other sweepback surfaces. As in FIG. 22, this can also be described as slider 400 comprising a shape configured such that the ambient fluid flow at the skew angle causes a torque on the slider 400.

Figure 24:
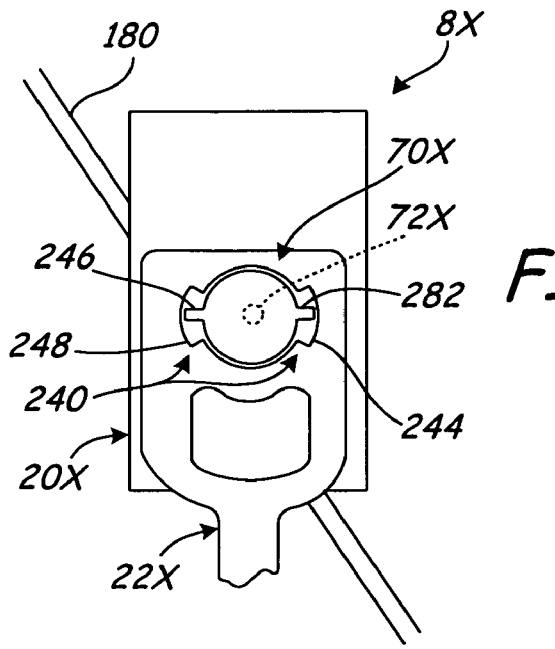
FIGS. 24 and 25 each depict a back plan view of a slider suspended from a suspension, and a data track of a disc surface, according to various embodiments.

FIG. 24 is an embodiment of a suspension assembly 8X which includes slider 20X and suspension 22X. Slider 20X is rotatably connected to suspension 22X by suspension interface 70X, which defines vertical axis 72X and includes rotation limiter 240. Rotation limiter 240 includes limiter pins 242 and 246 and pin recesses 244 and 248.

Figure 25:
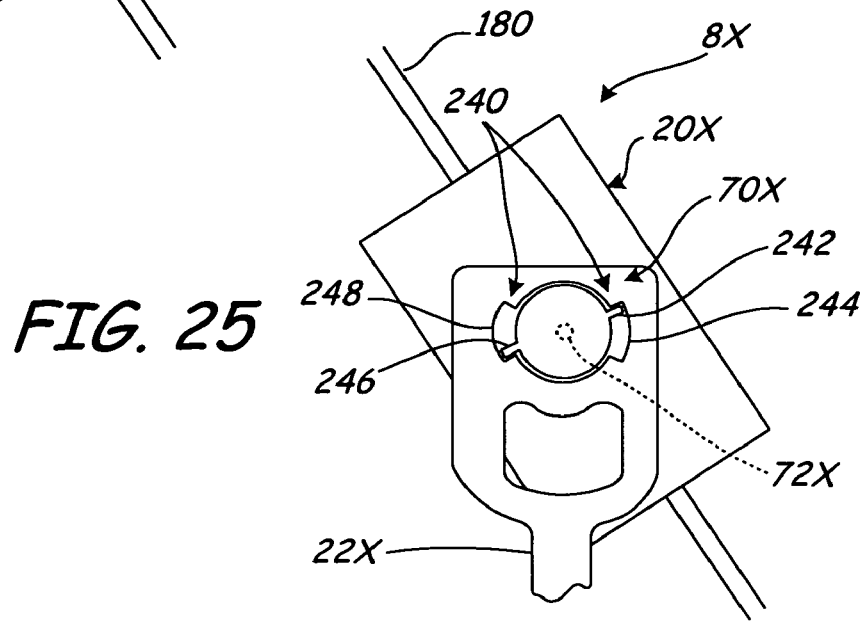

FIG. 25 is another depiction of suspension assembly 8X including slider 20X and suspension 22X. In FIG. 25 slider 20X has rotated relative to an ambient air flow, and therefore also relative to suspension 22X. Limiter pins 242 and 246 of rotation limiter 240 have butted against the ends of pin recesses 244 and 248. The extent of these pin recesses allows the slider to rotate about vertical axis 72X up to a certain angle corresponding to the maximum possible skew angle of the slider relative to a data storage system in which it is disposed.

For example, in some embodiments the maximum possible skew angle is approximately 15 degrees, which would occur at either the inner diameter or the outer diameter of the disc, while the actuator is placed such that a zero skew angle will occur at an intermediate track between the inner diameter and outer diameter. The rotation limiter 240 would therefore have a maximum rotation angle of approximately 15 degrees, which is the greatest angle by which the slider could rotate relative to the suspension. In other embodiments the maximum possible skew angle is about 12 degrees or 18 degrees, or in values above or below this range. The rotation limiter is an example of a mechanism that ensures the rotation of the slider 20X about the vertical axis 72X is limited to within the range that is useful for minimizing skew angle.

Figure 26:
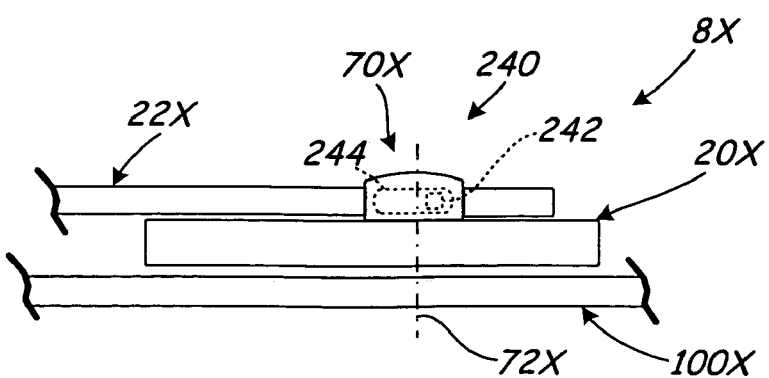
FIG. 26 depicts a side plan view of a slider suspended from a suspension, and opposing a disc, according to one embodiment.

FIG. 26 is a side plan view of suspension assembly 8X including slider 20X and suspension 22X. Slider 20X is operatively suspended on suspension 22X by suspension interface 70X, which includes rotation limiter 240. Rotation limiter 240 includes a limiter pin 242, visible in outline on the depicted side, with freedom of movement within pin recess 244, shown in outline.

While many of the above embodiments are presented in terms of the specific example of rotating the slider to minimize skew angle by passively exploiting the ambient fluid flow, some embodiments use different mechanisms and systems for rotating the slider to minimize skew angle, including using active control mechanisms, such as discussed referring to FIG. 6. Additional embodiments include a suite of more than one form of skew angle minimizing adaptation in the suspension interface, including combinations of passive and active skew angle minimizing adaptations as discussed above.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present invention, to the full extent indicated by the broad, general meaning of the terms in which the appended claims are expressed.

For example, the particular elements may vary depending on the particular application for the system, while maintaining substantially the same functionality. For another example, while specific examples such as a disc drive and a transducer are discussed as representative examples, a wide variety of data storage systems and data interfaces using various technologies are equally applicable, involving discs, tapes, drums, magnetic, magnetoresistive, giant magnetoresistive (GMR), optical, and other related data manipulation technologies. Additionally, while specific embodiments of a suspension assembly are described and depicted herein, many alternate embodiments are also contemplated which also lie within the metes and bounds of the claims, such as a suspension assembly in which a gimbal is combined with a pivot or swivel, as one illustrative example. It will be appreciated by those skilled in the art that the teachings of the present invention can be applied to a family of systems, devices, and means encompassed by and equivalent to the examples of embodiments described, without departing from the scope and spirit of the present invention. Further, still other applications for the sliders of the present invention are contemplated.

What is claimed is:

1. A suspension assembly comprising a suspension, a slider, and a suspension interface comprising a pivot and a pivot socket, wherein the pivot is rotatably engaged with the pivot socket, wherein the suspension interface provides substantial freedom of rotation of the slider about a yaw axis relative to the suspension.

2. The suspension assembly of claim 1, wherein the slider is enabled to rotate to reduce a skew angle of the slider relative to an ambient fluid flow.

3. The suspension assembly of claim 2, further comprising an aerodynamic surface, disposed on the slider, wherein the aerodynamic surface is configured such that the ambient fluid flow at the skew angle causes a torque on the slider.

4. The suspension assembly of claim 3, wherein the aerodynamic surface comprises a vertical stabilizer.

5. The suspension assembly of claim 4, wherein the aerodynamic surface comprises a longitudinal centerline, and the vertical stabilizer comprises a first sweepback surface disposed on a first side of the longitudinal centerline.

6. The suspension assembly of claim 5, wherein the first sweepback surface has a sweepback angle of from ten to eighty degrees, defined relative to a lateral direction.

7. The suspension assembly of claim 5, wherein the first sweepback surface is disposed on a first side of a trailing step comprised in the aerodynamic surface.

8. The suspension assembly of claim 5, wherein a second sweepback surface is disposed in substantially symmetric opposition to the first sweepback surface about the longitudinal centerline.

9. The suspension assembly of claim 4, wherein the vertical stabilizer comprises a substantially longitudinal fin.

10. The suspension assembly of claim 3, wherein the aerodynamic surface comprises a first sweepback surface disposed on a first lateral side of the slider.

11. The suspension assembly of claim 10, further comprising a second aerodynamic surface comprising a second sweepback surface disposed on a second lateral side of the slider opposite the first lateral side about a longitudinal axis of the slider.

12. The suspension assembly of claim 2, wherein the slider comprises a shape configured such that the ambient fluid flow at the skew angle causes a torque on the slider.

13. The suspension assembly of claim 1, wherein the suspension interface further comprises an active control mechanism.

14. The suspension assembly of claim 13, wherein the active control mechanism comprises a conductive coil disposed opposite a magnet.

15. The suspension assembly of claim 1, wherein the suspension interface comprises a swivel.

16. The suspension assembly of claim 1, wherein the suspension interface comprises a dial.

17. The suspension assembly of claim 1, wherein the suspension interface comprises a load recess, capable of receiving a load point button comprised in the suspension.

18. The suspension assembly of claim 17, wherein the load recess comprises a recess track, wherein the load point button is enabled to slide along the load recess track.

19. The suspension assembly of claim 1, wherein the suspension interface comprises a load point button, adapted to be in contact with a load point recess positioned on the suspension.

20. The suspension assembly of claim 1, wherein a portion of the suspension interface is composed of sapphire, ruby, glass, or diamond-like carbon (DLC).

21. The suspension assembly of claim 1, wherein the suspension interface comprises a rotation limiter that prevents the slider from rotating beyond a limit angle.

22. The suspension assembly of claim 1, further comprising a data interface head disposed on the slider.

23. The suspension assembly of claim 22, wherein the data interface head is a magnetoresistive head adapted for perpendicular recording.

24. The suspension assembly of claim 22, wherein the data interface head is a magnetoresistive head adapted for longitudinal recording.

25. A slider, comprising:
means for operatively suspending the slider from a suspension, the means comprising a pivot and a pivot socket, wherein the pivot is rotatably engaged with the pivot socket, wherein the means provides substantial freedom of rotation of the slider about a yaw axis; and
means for exploiting an ambient fluid flow to reduce a skew angle of the slider relative to the ambient fluid flow.

26. The slider of claim 25, further comprising means for enabling the slider to rotate to reduce the skew angle of the slider relative to the ambient fluid flow.

27. The slider of claim 25, wherein the means for operatively suspending the slider from a suspension further comprises a pivot, a pivot socket, a swivel, or a dial.

28. The slider of claim 25, wherein the means for exploiting the ambient fluid flow comprises an aerodynamic surface, on any face of the slider, adapted to use the ambient fluid flow at the skew angle to cause a torque on the slider.

29. The slider of claim 25, wherein the means for exploiting the ambient fluid flow comprises a vertical stabilizer.

30. The slider of claim 29, wherein the vertical stabilizer comprises a left sweepback surface and a right sweepback surface, disposed substantially opposite each other about a longitudinal centerline of the vertical stabilizer.

31. A suspension assembly comprising:
a suspension, comprising a slider interface component; and
a slider comprising:
an aerodynamic surface; and
a back surface that comprises a suspension interface component, wherefrom the slider is operatively suspended from the slider interface component of the suspension, providing the slider with substantial freedom of yaw rotation, whereby the aerodynamic surface is adapted to translate a force of an ambient air flow at a skew angle relative to the slider into a torque about the suspension interface which minimizes the skew angle.

32. The suspension assembly of claim 31, wherein the slider interface component and the suspension interface component are comprised in a suspension interface.

33. The suspension assembly of claim 32, wherein the suspension interface comprises a pivot joint, which comprises a pivot and a pivot socket configured to receive the pivot.

34. The suspension assembly of claim 32, wherein the suspension interface comprises a swivel.

35. The suspension assembly of claim 32, wherein the suspension interface comprises a dial.

36. The suspension assembly of claim 32, wherein the suspension interface comprises a load point button and a load recess track configured to receive the load point button.

37. The suspension assembly of claim 31, wherein the aerodynamic surface is opposite to the back surface.

38. The suspension assembly of claim 31, wherein the aerodynamic surface is lateral to the back surface.

* * * * *

UNITED STATES PATENT AND TRADEMARK OFFICE
CERTIFICATE OF CORRECTION

PATENT NO. : 7,652,847 B2
APPLICATION NO. : 10/734377
DATED : January 26, 2010
INVENTOR(S) : Weiss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 960 days.

Signed and Sealed this

Twenty-third Day of November, 2010

David J. Kappos
*Director of the United States Patent and Trademark Office*